Figure 1:
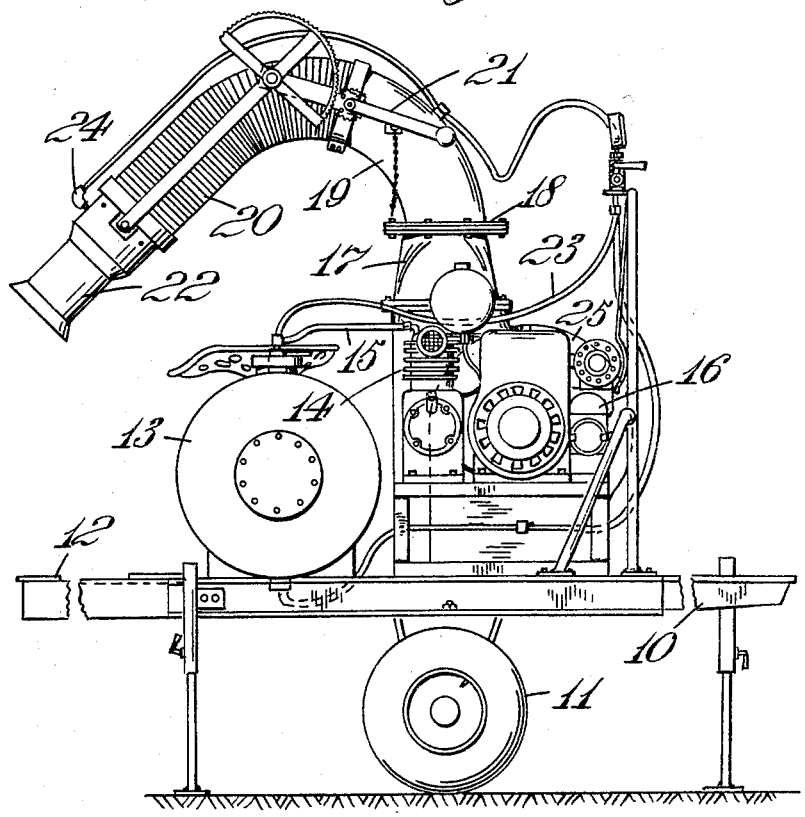

March 13, 1956  E. J. BALS  2,738,226
CROP SPRAYING APPARATUS

Filed Nov. 2, 1951  4 Sheets-Sheet 1

INVENTOR
Edward J. Bals

By Watson, Cole, Grindle & Watson

March 13, 1956 E. J. BALS 2,738,226
CROP SPRAYING APPARATUS
Filed Nov. 2, 1951 4 Sheets-Sheet 2
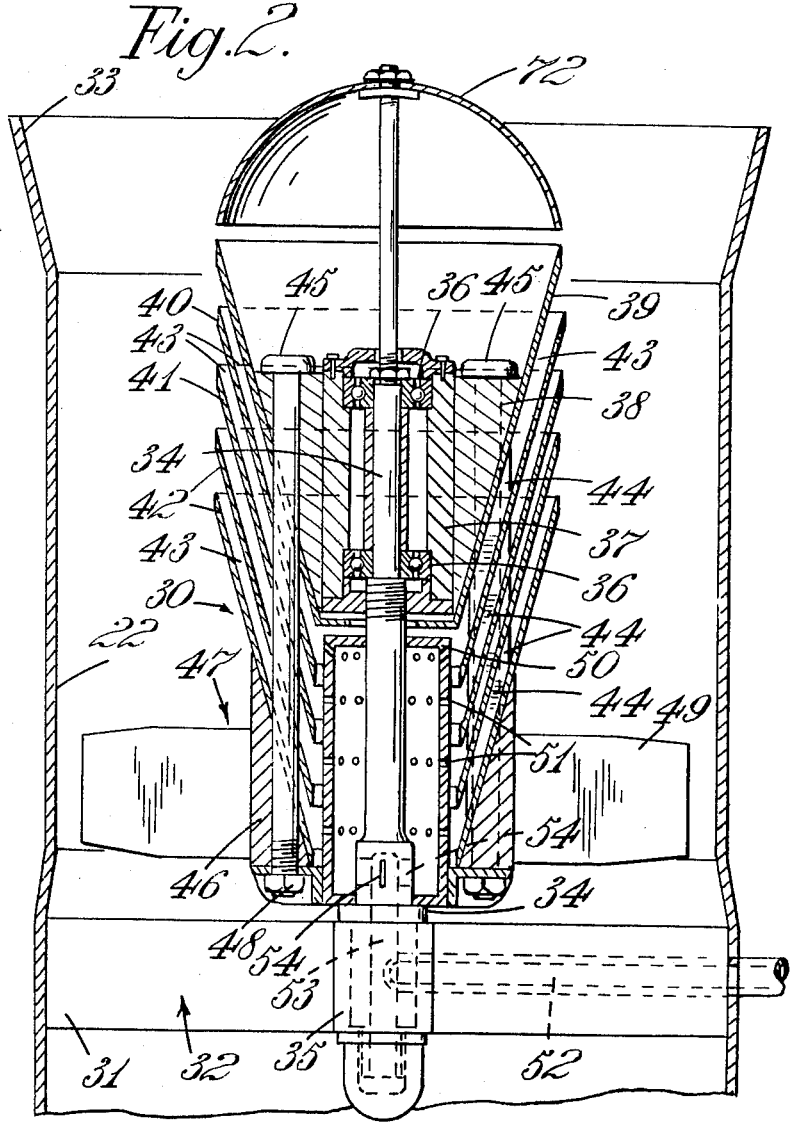
INVENTOR
Edward J. Bals
By Watson, Cole, Grindle & Watson

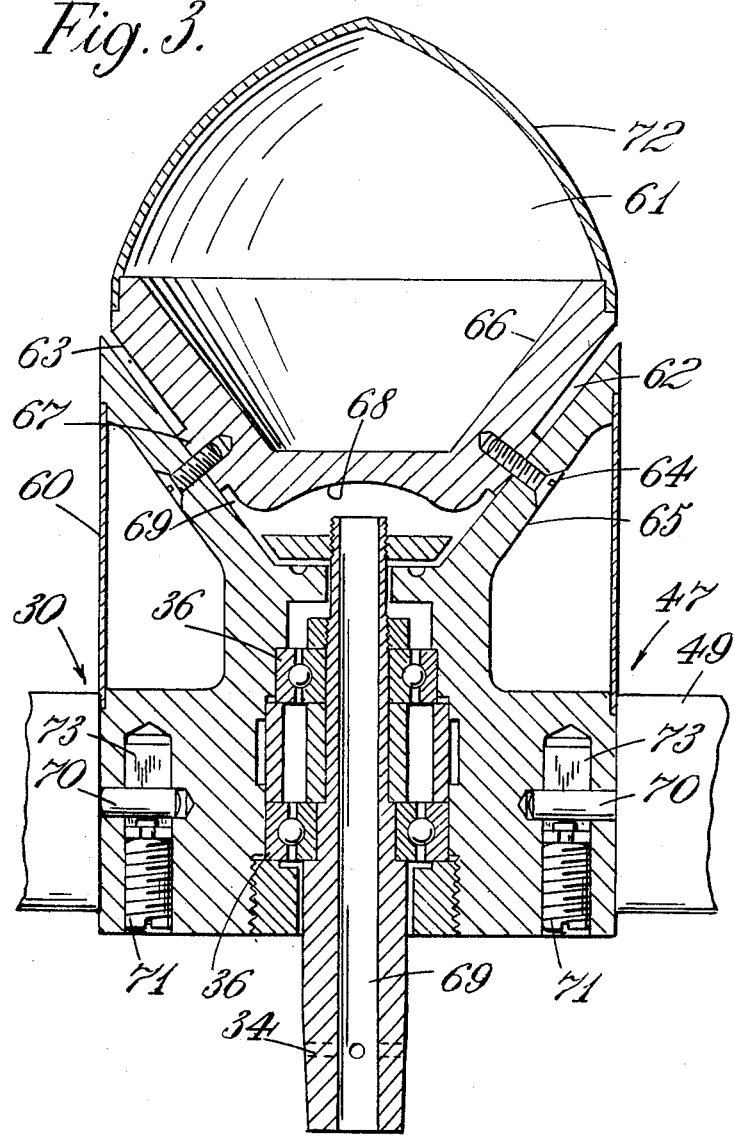

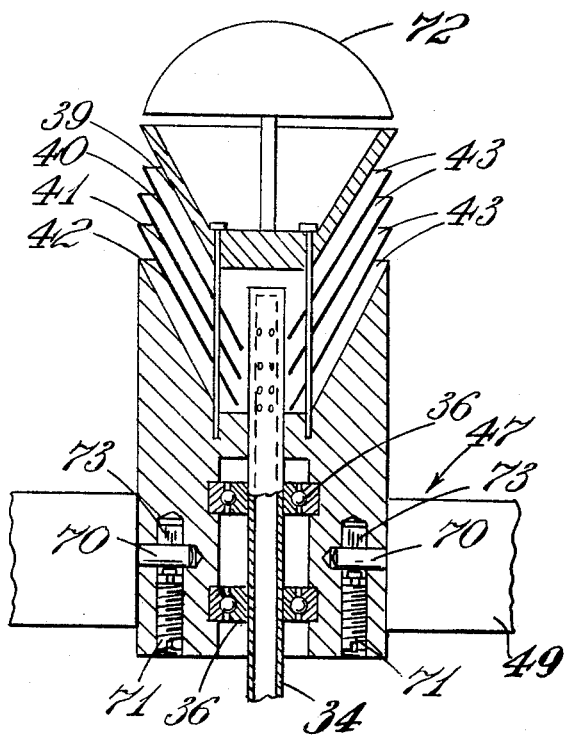

United States Patent Office 2,738,226
Patented Mar. 13, 1956

2,738,226

CROP SPRAYING APPARATUS

Edward Julius Bals, London, England

Application November 2, 1951, Serial No. 254,593

Claims priority, application Great Britain November 6, 1950

14 Claims. (Cl. 299—63)

The present invention relates to apparatus for spraying crops or the like by which is to be understood apparatus for treating pasture lands, re-forestation sites, corn lands, tea and cotton plantations and similar relatively large tracks of ground and the crops growing thereon. The present invention is concerned with apparatus for spraying crops with insecticides, fungicides, herbicides (selective or otherwise) or other crop-treating materials as a liquid suspension or a solution—more particularly in water.

According to the present invention a crop spraying apparatus comprises a duct, means for supplying the duct with a stream of air to travel lengthwise therethrough, a centrifugal atomiser within the air duct and comprising at least a pair of sleeves extending lengthwise of the duct and each of progressively increasing diameter in the direction of the air stream, said sleeves being co-axially nested one within the other to define a passageway between them, a support for the atomiser in the duct so that the sleeves are rotatable, as an assembly, about their long axes, a nozzle from which a jet of liquid insecticide, fungicide or herbicide is directed into the atomiser, said liquid passing in a radial direction into said passageway at the upstream end thereof and a motor to be driven by the air stream passing through the air duct to drive said stream assembly whereby the latter throws liquid outwardly into the stream of air, which carries it in an atomised state towards the crops.

Practical constructions of the present invention will now be described, merely by way of example, with reference to the accompanying drawings whereof—

Figure 1 is a side elevation of a crop spraying apparatus in accordance with the present invention, Figure 2 is a longitudinal section through the discharge end of the air duct and showing the details of construction of the centrifugal atomiser and the air motor by which it is driven, Figure 3 is a view similar to Figure 2 and showing an alternative construction of centrifugal atomiser and air motor, and Figure 4 diagrammatically illustrates a third construction of centrifugal atomiser and air motor in accordance with the present invention.

Referring to Figure 1:

The apparatus comprises a chassis 10 mounted on wheels 11 so that the apparatus may be moved between the crops to be treated or along the marginal edges of the fields in which they grow. To draw the apparatus along the chassis 10 is formed, in known manner, with a draw bar 12 which is connectible with a tractor or other power driven vehicle. Mounted on the chassis 10 is a tank 13 to contain the liquid insecticide, fungicide or herbicide (hereinafter called the spraying liquid) the tank 13 being pressurised by a compressor 14 connected thereto by pipe 15, the compressor being driven by an internal combustion engine 16. The internal combustion engine 16 also drives a fan (of which the casing is shown at 25) which delivers air to a vertical trunk 17 the upper end of which carries a bearing 18 on which is mounted the air duct 19 referred to above. The air duct 19 is adjustable about a horizontal plane on the bearing 18 and comprises a flexible portion 20 which is adjustable, by the hand-lever 21, in the vertical direction. The air duct 19 terminates in a casing 22 from which the airstream is discharged. The spraying liquid is forced under pressure from the tank 13 and passes by way of a pipe 23 to a connector 24 for supply to the casing 22. The centrifugal atomiser referred to is mounted within the casing 22 and the spraying liquid is delivered to the atomiser as later described.

Referring now to Figure 2: the centrifugal atomiser, which is generally indicated by the reference numeral 30, is supported by the radial arms 31 of a spider 32 within the casing 22. The stream of air passing along the duct 19 flows over the atomiser 30 to the discharge end 33 of the casing 22, the air passing between the arms 31 of the spider 32.

The centrifugal atomiser comprises a stationary spindle 34 carried by the nave 35 of the spider 32, the upper end of the spindle 34 carrying roller bearings 36 upon which is mounted a boss 37 so that the boss is capable of rotation relatively to the stationary shaft. The boss 37 is integrally formed with a plurality of circumferentially spaced, radial lugs 38 (for example, four equi-spaced lugs) the lower face of each of which is obliquely inclined with respect to the axis of the shaft 34. A frusto-conical sleeve 39 is mounted on the lugs 38 so that the inner surface of the sleeve accurately engages the lugs. The sleeve 39 is nested within a further sleeve 40 so that the sleeves are spaced apart to form a passageway 43 between them and there is provided a plurality of circumferentially spaced distance pieces 44 (one for each lug 38) to maintain the sleeves apart. The distance pieces 44 are suitably shaped to conform with the outer and inner surfaces of the sleeves 39 and 40 respectively. Similarly, there is provided a further pair of nested sleeves 41 and 42 correspondingly supported and held apart by distance pieces. A bolt 45 passes through each of the lugs 38 and between adjacent distance pieces, the lower end of each bolt being received by the hub 46 of an air motor, generally indicated by the reference numeral 47. The hub 46 of the air motor is shaped accurately to fit the outer surface of the sleeve 42. The whole assembly is drawn up by the nuts 48. In this way there is produced an assembly comprising four co-axial nested sleeves 39—42 between each pair of which is a passageway 43 and the air motor 47, mounted for rotation by bearings 36 on shaft 34.

The hub 46 carries a plurality of integral air vanes 49 so that as the airstream passes along the casing 22 and around the centrifugal atomiser the motor 47 is driven whereby the sleeve assembly is rotated at a high speed.

The lower portion of the shaft 34 is surrounded by a stationary cylindrical chamber 50 having, opposite the upstream end of each passageway 43, a plurality of circumferentially spaced, fine-bore holes or nozzles 51.

One of the spider arms 31 constitutes a conduit 52 which communicates, on the one hand, with the connector 24 and, on the other hand, with an axial hole 53 in the shaft 34 and thence through ports 54 with the chamber 50. The liquid under pressure delivered to the chamber is discharged as a plurality of radial jets through the holes 51 to impinge on the inner surfaces of the upstream ends of the sleeves 39—42.

In the operation of the apparatus, the motor 47 is driven by the airstream passing along the casing 22. The spraying liquid is fed into the chamber 50 under pressure and is directed as radial jets against the inner surfaces of the sleeves as described above. The jets on striking the inner surfaces of the sleeves are broken up and subsequently centrifuged to be thrown out at the downstream ends of the sleeves into the airstream, passing along the casing 22, in a finely atomised state. Substantially all of the liquid thrown into the airstream is carried away in the atomised state by the stream of air leaving the casing at 33.

The spraying liquid in passing along the passageways 43 is engaged by the distance pieces 44 and rotated thereby so that slip between the liquid and the sleeves is reduced and the speed of rotation of the liquid is consequently increased. The centrifugal action is thereby increased.

With the arrangement described, the spraying capacity of the apparatus is substantially increased by the provision of an atomiser having four liquid passageways 43.

It will be appreciated that the number of such passageways is selected to obtain a desired spraying capacity.

The air stream is delivered from the duct with sufficient force that it will, on a still day, be projected over the crops to be treated for a considerable distance carrying the liquid insecticide or the like with it. As a consequence, the insecticide or the like may be applied to the crops without passing repeatedly through the crops and instead this may be done from the edge of the field, for instance.

It is preferred that the stream of air be directed upwardly to a small extent so that substantially uniform treatment is obtained over the projected length of the air stream.

In tropical or semi-tropical lands it may be found that excessive evaporation occurs when the stream of air is directed on to the liquid curtain of insecticide or the like thrown off radially from the sleeves 39—42. To reduce this loss an emulsifiable oil may be added to the spraying liquid.

In the construction illustrated in Figure 3 the centrifugal atomiser 30, as in the arrangement described with reference to Figure 2, is mounted for rotation on the stationary shaft 34 through the agency of roller bearings 36. The atomiser comprises a lower member 60 (which may be an aluminium casting or may be of sheet metal construction having suitably reinforced parts as hereinafter described) and an upper member, generally indicated at 61. The downstream end of the lower member 60 is formed with a conical recess 62, the upstream end of the member 61 having a correspondingly formed projection 63. The member 61 is attached to the member 60 by studs 64 which pass through a wall 65 of the member 60 and into a wall 66 of the member 61. The wall 66 is provided with a plurality of circumferentially spaced distance pieces 67 through one or more of which the studs 64 pass, the distance pieces 67 being provided to maintain the surfaces 62, 63 apart by a required amount. The space between the surfaces 62 and 63 constitutes a passageway and corresponds with the passageways 43 of Figure 2.

The central portion of the wall 66 is dished at 68 and is smoothly blended, as at 69, into the surface 63. The shaft 34 has an axial hole 69 which is directed towards the centre of the dished portion 68, the shaft 34 being spaced a short distance therefrom.

The downstream end of the member 60 has a plurality of radial holes each to receive an attachment pin 70 carried by a vane 49 of the air motor 47 and for each pin 70 there is an axial plug 71 provided to lock the pin 70 to the member 60. The axial plug 71 may be unscrewed to release the pin 70 whereupon the angle of attack of the vane 49 in relation to the airstream may be varied. In this way the speed of rotation of the air motor may be adjusted to produce a particle size of the spraying liquid consistent with the crop, the liquid being sprayed on a given occasion and the atmospheric conditions prevailing on the occasion. In the particular arrangement of the drawings, the pin 70 is locked by a wedge 73 connected to plug 71 for axial adjustment thereby to engage and release pin 70.

With the arrangement described the liquid to be sprayed is fed under pressure along the axial hole 69 and is directed as a jet against the dished portion 68.

With the construction described with reference to Figure 3, since the liquid is discharged from the hole 69 against the dished portion 68 (where the peripheral speed of member 61 is a minimum) the amount of slip between the liquid and the rotating member 61 is small; as the liquid spreads radially outwardly its rotational speed is gradually increased. In this way the liquid is efficiently translated from an axial movement to a radial movement and it is thereby possible to pass a relatively large quantity of liquid through the apparatus. As the liquid gains rotational speed it travels outwardly and along the passageway between surfaces 62 and 63 and is discharged from the downstream end thereof in an outward radial direction as a curtain of liquid in a finely atomised state. The atomised liquid is then carried by the airstream towards the crops as described above with reference to Figure 2.

In the construction shown in Figure 4 there is provided a plurality of sleeves 39—42 as in the construction shown in Figure 2. With this arrangement, however, the sleeves are disposed above the bearings 36 and the tubular stationary shaft 34 constitutes a duct for the spraying liquid which is discharged from the duct through the fine-bore holes or nozzles 51 into the passageways 43. It will also be noted from Figure 4 that as in the construction of Figure 3 the vanes 49 of the air motor 47 are adjustable as to their angle of attack.

In each of the constructions described the downstream end of the atomiser is smoothly blended off by a bullet or cap 72.

Casing 22 may be shaped or provided with an internal baffle to direct the air somewhat inwardly towards the curtain of atomised spraying liquid to prevent it being thrown against the casing wall so that substantially all the liquid is carried away on the airstream.

I claim:

1. A crop spraying apparatus comprising a duct, a blower for supplying the duct with a stream of air to travel lengthwise therethrough a centrifugal atomiser within the air duct and comprising at least a pair of sleeves extending lengthwise of the duct and each of progressively increasing diameter in the direction of the air stream, said sleeves being co-axially nested one within the other to define a passageway between them, a support for the atomiser in the duct so that the sleeves are rotatable, as an assembly, about their long axes, a nozzle from which a jet of liquid insecticide, fungicide or herbicide is directed into said passageway between the sleeves of the atomiser at the upstream end thereof and an air motor supported in said duct to be driven by the air stream passing through the air duct and operatively connected to drive said sleeve assembly whereby the latter throws the liquid outwardly into the stream of air, which carries it in an atomised state towards the crops.

2. Apparatus according to claim 1 wherein the centrifugal atomiser comprises two or more pairs of said nested sleeves rotatably mounted as an assembly.

3. Apparatus as claimed in claim 1 wherein there is provided a chamber lying within the upstream end of said sleeve assembly and having, for each passageway between the sleeves, a plurality of fine-bore holes from which the liquid insecticide or the like is directed into the passageway.

4. Apparatus as claimed in claim 3 in which the atomiser and air motor are mounted, as an assembly, for rotation on a stationary shaft supported within the air duct by a radial arm secured to the air duct, said shaft passing through said chamber.

5. Apparatus according to claim 4 wherein the liquid insecticide or the like is delivered to said chamber through said radial arm and stationary shaft.

6. Apparatus as claimed in claim 1 wherein the atomiser and air motor are mounted, as an assembly, for rotation on a tubular stationary shaft supported within the air duct by a radial arm and secured to the air duct, the liquid insecticide or the like being delivered to said tubular shaft through said radial arm, said shaft constituting said liquid conduit.

7. Apparatus as claimed in claim 1 wherein the sleeves of the pair of sleeves are held apart to provide said passageway by a plurality of circumferentially spaced distance pieces lying within the passageway.

8. Apparatus as claimed in claim 7 in which the sleeves are axially clamped together.

9. Apparatus according to claim 8 wherein the sleeves are clamped between a boss, lying within the sleeve furthest downstream of the atomiser, and hub, which carries the vanes of said air motor and which surrounds the sleeve furthest upstream of the atomiser by circumferentially spaced bolts passing axially from said boss to said motor.

10. Apparatus according to claim 1 in which the atomiser is mounted for rotation on bearings disposed at the downstream end of the atomiser.

11. Apparatus according to claim 1 wherein the atomiser is mounted for rotation on bearings disposed upstream of the atomiser.

12. Apparatus as claimed in claim 1 wherein the inner nested sleeve is formed with a central dished portion at its upstream end, said portion communicating smoothly with said passageway and wherein the jet of liquid is directed axially into the dished portion from which the liquid spreads radially outwardly and is directed into said passageway.

13. Apparatus as claimed in claim 1 wherein the air motor comprises a hub, a plurality of vanes and a connection between each vane and the hub which permits the angle of attack of the vanes to be adjusted.

14. Apparatus as claimed in claim 13 wherein each vane carries a pin to enter the hub in a radial direction and a plug adjustably carried by the hub to engage the pin and lock it to the hub.

References Cited in the file of this patent

UNITED STATES PATENTS

| Number | Name | Date |
|---|---|---|
| 1,169,599 | Barker | Jan. 25, 1916 |
| 1,697,254 | Webster | Jan. 1, 1929 |
| 2,369,216 | Crisp | Feb. 13, 1945 |
| 2,509,076 | Royer | May 23, 1950 |
| 2,577,238 | Edwinson et al. | Dec. 4, 1951 |
| 2,607,571 | Hission, Jr. | Aug. 19, 1952 |